Patented Nov. 21, 1922.

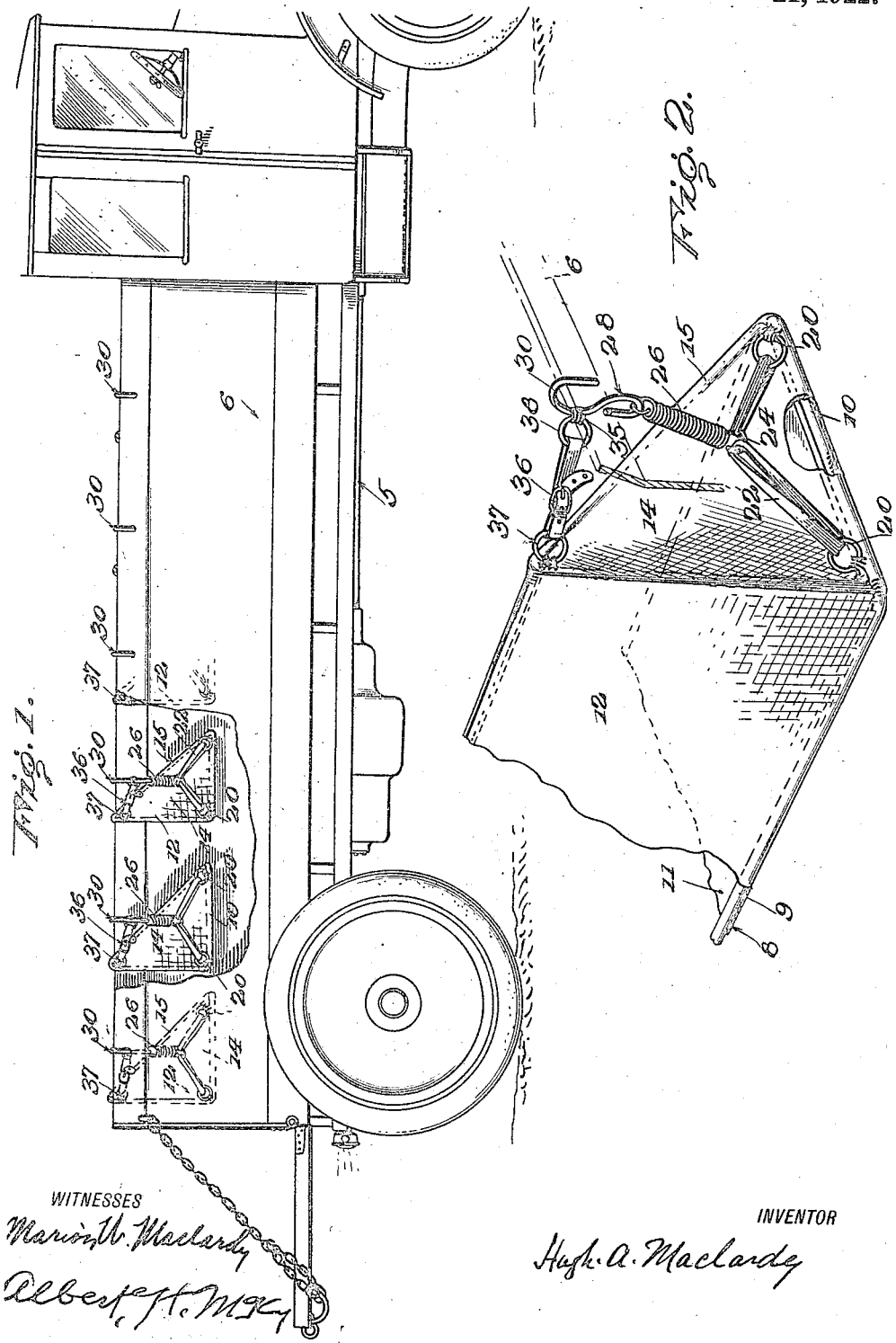

1,436,275

UNITED STATES PATENT OFFICE.

HUGH A. MACLARDY, OF ROSLINDALE, MASSACHUSETTS.

AUXILIARY SEAT FOR MOTOR VEHICLES.

Application filed January 26, 1922. Serial No. 531,965.

*To all whom it may concern:*

Be it known that I, HUGH A. MACLARDY, a subject of Great Britain, residing at Roslindale, in the county of Suffolk and State of Massachusetts, have invented certain new and useful Improvements in Auxiliary Seats for Motor Vehicles, of which the following is a specification.

This invention relates to auxiliary seats for motor vehicles.

An important object is to provide an auxiliary seat for motor vehicles which may be used to temporarily increase the seating capacity of a passenger vehicle.

Further, the invention aims to provide an emergency seat which may be used when it is desired to convert a motor truck into a bus or passenger carrier.

A further aim is to provide an emergency seat for motor vehicles which may be compactly folded when not in use, so that the same may be stored in a small space.

A further object is to provide a seat which is of highly simplified construction, durable in use, and cheap to manufacture.

Other objects and advantages of the invention will be apparent during the course of the following description.

In the accompanying drawing forming a part of this application and in which like numerals are employed to designate like parts throughout the same, Figure 1 is a fragmentary side elevation of a motor vehicle equipped with the improved seat.

Figure 2 is a fragmentary perspective of the seat.

In the drawing wherein for the purpose of illustration is shown a preferred embodiment of the invention, the numeral 5 generally designates a motor vehicle having a truck body 6 to which the improved seat is adapted to be connected. It is to be understood, however, that the improved seat is also capable of use on a passenger vehicle in which case the seat would be positioned between the front and rear seats of the vehicle.

The improved seat comprises a metallic frame 8 having front and rear bars 9 arranged in spaced parallel relation and connected by end bars 10. A suitable covering 11 is extended over the frame and forms a bottom piece while a suitable back 12 is secured to the rear bar 9 and extends upwardly from the same. The back 12 and the triangular end walls 14 may be of such material as canvas or the like. The triangular end walls are secured along their rear edges to the back 12 and have their lower edges secured to the end bars 10 in any suitable manner as by stitching. The forward inclined edges of the end walls 14 are stiffened in any suitable manner as by stitching or a light wire so that when the seat is collapsed the back will fold and the trinagular end walls will rest flatly on the folded back.

Attaching loops 20 are secured to the corners of the frame by stitching or other suitable means and have connection with straps 22, the upper portions of which are joined by a loop 24. With reference to Figure 2, it will be observed that the loop 24 is connected to the lower end of a coil spring 26 suspended from the lower eye of an S-shaped hook 28. One hook 28 is arranged at each end of the seat and is provided with a bill 30 by means of which the hook may be connected to the sides of the vehicle body.

The hook is limited in its movement with relation to the triangular end walls 14 by means of a strap 35 having a buckle 36 by means of which the effective length of the same may be varied. Loops 37 and 38 connect the strap 35 to the end walls 14 and to the hooks 30.

In use, the seat may be conveniently connected to the sides of a vehicle body by means of the S-shaped hooks 28 and the springs 26 will reduce the shocks to a minimum. The hooks 30 may be adjusted for vehicles of various widths by adjustments of the straps 35 through the medium of the buckles 36.

The improved seat may be readily collapsed so that the same may be conveniently carried in the storage space of a motor vehicle.

Any desired number of seats may be employed in a truck as illustrated in Figure 1, and when the improved seat is so employed the truck may be converted into a bus. Only one of the improved seats is employed on a motor vehicle in which case the seating capacity of the motor vehicle is substantially increased.

I claim:—

A seat comprising a frame of rectangular formation, a covering for the frame, a back secured to said frame, triangular end walls of flexible material secured to the ends of said back and to the ends of said frame, the forward edges of said end walls being stiffened, a loop connected to each corner of said frame, straps connected to said loops, cushioning springs connected to said straps, S-shaped hooks secured to the upper ends of said springs and having attaching bills, adjustable straps connected to the upper portions of said end walls and to said hooks whereby the space between the hooks may be varied.

In testimony whereof, I have affixed my signature in the presence of two witnesses.

HUGH A. MACLARDY.

Witnesses:
MARION W. MACLARDY,
ALBERT H. MCCAY.